(12) United States Patent
Li et al.

(10) Patent No.: US 8,221,713 B2
(45) Date of Patent: Jul. 17, 2012

(54) METHOD FOR MAKING METAL TITANATE

(75) Inventors: Ya-Dong Li, Beijing (CN); Zi-Yang Huo, Beijing (CN); Chen Chen, Beijing (CN)

(73) Assignees: Tsinghua University, Beijing (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 665 days.

(21) Appl. No.: 12/002,162

(22) Filed: Dec. 14, 2007

(65) Prior Publication Data

US 2008/0241042 A1  Oct. 2, 2008

(30) Foreign Application Priority Data

Mar. 30, 2007  (CN) .......................... 2007 1 0073767

(51) Int. Cl.
*C01F 17/00* (2006.01)
*C01F 11/00* (2006.01)
*C01G 1/00* (2006.01)
*C01G 23/00* (2006.01)

(52) U.S. Cl. ............ 423/263; 423/598; 423/69; 423/71; 423/84; 423/594.16; 501/136; 501/137

(58) Field of Classification Search .................... 423/598
See application file for complete search history.

(56) References Cited

U.S. PATENT DOCUMENTS

| 4,643,984 | A | * | 2/1987 | Abe et al. ...................... 501/134 |
| 4,829,033 | A | * | 5/1989 | Menashi et al. .............. 501/139 |
| 5,087,437 | A | * | 2/1992 | Bruno et al. ................... 423/598 |
| 5,710,086 | A | * | 1/1998 | Brunelle et al. .............. 502/171 |
| 6,162,752 | A | * | 12/2000 | Kawamoto et al. ........... 501/137 |
| 6,284,216 | B1 | * | 9/2001 | Sakai et al. .................... 423/598 |
| 6,447,910 | B1 | * | 9/2002 | Wataya ......................... 428/403 |
| 6,893,623 | B2 | * | 5/2005 | Ohmori et al. ............... 423/598 |
| 7,182,930 | B2 | * | 2/2007 | Tsay et al. .................... 423/598 |
| 7,233,378 | B2 | * | 6/2007 | Obayashi et al. ............. 349/137 |

FOREIGN PATENT DOCUMENTS

| CN | 1137054 | | 2/2004 |
| CN | 1139553 | | 2/2004 |
| KR | 10-20030068861 | * | 8/2003 |

OTHER PUBLICATIONS

Kralinina, et al. Chemistry of Heterocyclic Compounds, 1970, 6(3), 290-292.*

* cited by examiner

*Primary Examiner* — Melvin C Mayes
*Assistant Examiner* — Yun Qian
(74) *Attorney, Agent, or Firm* — Altis Law Group, Inc.

(57) ABSTRACT

A method for making a mono-dispersed metal titanate includes the steps of: (a) mixing titanate ester, metal salt, and rare earth metal salt in a molar ratio of 1:1:x in a reaction medium comprised of ethanol and water to form a solution, wherein x is in the range from 0 to 0.1; (b) heating the solution, under an alkaline condition to form a white sediment; (c) filtering out liquid part of the solution to obtain the white sediment, (d) washing the white sediment, and (e) drying the white sediment to obtain mono-dispersed metal titanate.

15 Claims, 9 Drawing Sheets

METHOD FOR MAKING METAL TITANATE

BACKGROUND

1. Field of the Invention

The invention relates to a method for making metal titanate, particularly, to a method for making mono-dispersed metal titanate.

2. Discussion of Related Art

Electronic ceramic materials with high dielectric constant were first discovered in the 1940s. Metal titanate is a main basic material of electronic ceramic materials. Since their excellent dielectric, piezoelectric, and ferroelectric properties, electronic ceramic materials are widely used in the manufacture of electric devices, such as ceramic capacitors, microwave devices, nonlinear rheostats, ferroelectric memories, and other electronic devices. With the developing needs of miniaturization, thinness, and lightness of components, high-purity metal titanate ultra-fine powders are demanded more and more. Nano-scale metal titanate ultra-fine powders have unique insulation, piezoelectric, dielectric, pyroelectric and semiconductor properties, so they are expected to be potential materials to satisfy the aforementioned demand, e.g., a multi-layer capacitor manufactured via barium titanate nano-powders can significantly reduce the thickness of each layer and thereby increase the number of the layers, and as a result, the capacitors have an improved capacitance and small volume.

Three main methods for synthesizing metal titanate material are oxalic acid method, sol-gel method, and melting method. The metal titanate material synthesized by the aforementioned methods is very stable. However, the aforementioned methods for synthesizing the metal titanate are complicated, environmentally unclean, need catalyst, and have small production yields, and the products synthesized via the aforementioned methods have big size and are hard to disperse.

What is needed, therefore, is a simple and fast method for making mono-dispersed metal titanate with fine, uniform particles and good dispersion.

SUMMARY

In one embodiment, a method for making mono-dispersed metal titanate includes the steps of: (a) mixing titanate ester, metal salt, and rare earth metal salt in a molar ratio of 1:1:x in a reaction medium comprised of ethanol and water to form a solution, wherein x is in the range from 0 to 0.1; (b) heating the solution, under an alkaline condition to form a white sediment; (c) filtering out liquid part of the solution to obtain the white sediment, (d) washing the white sediment, and (e) drying the white sediment to obtain mono-dispersed metal titanate.

Other advantages and novel features of the present method for making the mono-dispersed metal titanate will become more apparent from the following detailed description of present embodiments when taken in conjunction with the accompanying drawings.

BRIEF DESCRIPTION OF THE DRAWINGS

Many aspects of the present method for making the mono-dispersed metal titanate can be better understood with reference to the following drawings. The components in the drawings are not necessarily to scale, the emphasis instead being placed upon clearly illustrating the principles of the present method for making the mono-dispersed metal titanate.

Figure 1:
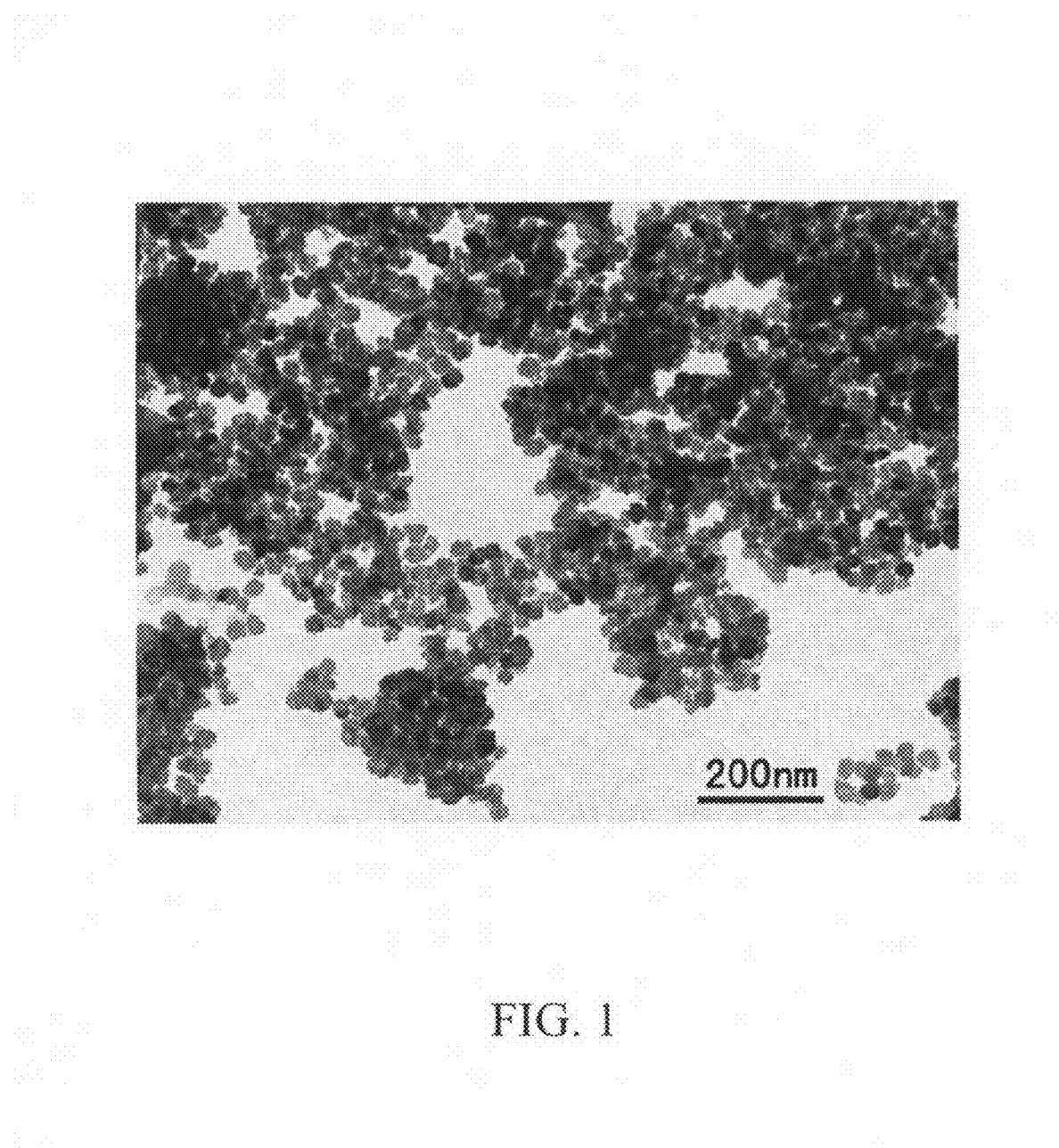
FIG. 1 shows a Transmission Electron Microscope (TEM) image of the mono-dispersed barium titanate powders in accordance with a first embodiment.

Corresponding reference characters indicate corresponding parts throughout the several views. The exemplifications set out herein illustrate at least one preferred embodiment of the present method for making the mono-dispersed metal titanate, in at least one form, and such exemplifications are not to be construed as limiting the scope of the invention in any manner.

DETAILED DESCRIPTION OF PREFERRED EMBODIMENTS

Reference will now be made to the drawings to describe, in detail, embodiments of the method for making the mono-dispersed metal titanate.

A method for making a mono-dispersed metal titanate includes the steps of: A method for making a mono-dispersed metal titanate includes the steps of: (a) mixing titanate ester, metal salt, and rare earth metal salt in a molar ratio of 1:1:x in a reaction medium comprised of ethanol and water to form a solution, wherein x is in the range from 0 to 0.1; (b) heating the solution, under an alkaline condition to form a white sediment; (c) filtering out liquid part of the solution to obtain the white sediment, (d) washing the white sediment, and (e) drying the white sediment to obtain mono-dispersed metal titanate.

In step (a), the rare earth metal salt is doped. The metal titanate, using the doped rare earth metal salt as a raw material, can be used as an excellent fluorescent material. In step (b), the white sediment is formed using a hydrothermal process or a refluxing process. The hydrothermal process is performed at a temperature in an approximate range from 90° C. to 240° C. for a time period in an approximate range from 6 hours to 24 hours. The refluxing process is performed at a temperature in an approximate range from 60° C. to 90° C. for a time period in an approximate range from 20 hours to 24 hours.

Reaction equations of the present embodiments are as follows:

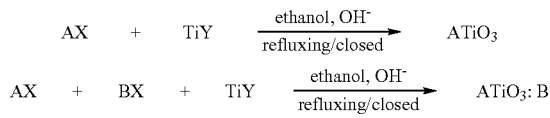

Where A can be selected from a group consisting of Ba, Sr, Pb, Mg, Ca and other metals. B can be selected from rare earth metals, such as Eu, Tb, Er, Yb, and Tm. X can be selected from a group consisting of Cl, OH, $NO_3$, Ac, $C_2O_4$ and so on. TiY can be selected from a group consisting of $TiCl_4$, $Ti(OC_2H_5)_4$, $Ti(OC_4H_9)_4$, $Ti(OCH(CH_3)_2)_4$ and so on. After the reactions as described above, white sediment is acquired and the white sediment is filtered, washed, and dried to obtain mono-dispersed metal titanate. A size of the mono-dispersed metal titanate is in an approximate range from 10 nanometers to 100 nanometers.

The present method is further illustrated by the following examples, which are not to be construed in any way as imposing limitation upon the scope thereof. On the contrary, it is to be clearly understood that resort may be had to various other aspects, embodiments, modifications, and equivalents thereof which, after reading the description herein, may suggest themselves to one of ordinary skill in the art without departing from the spirit of the present method or the scope of the appended claims.

EXAMPLE (1)

Figure 2:
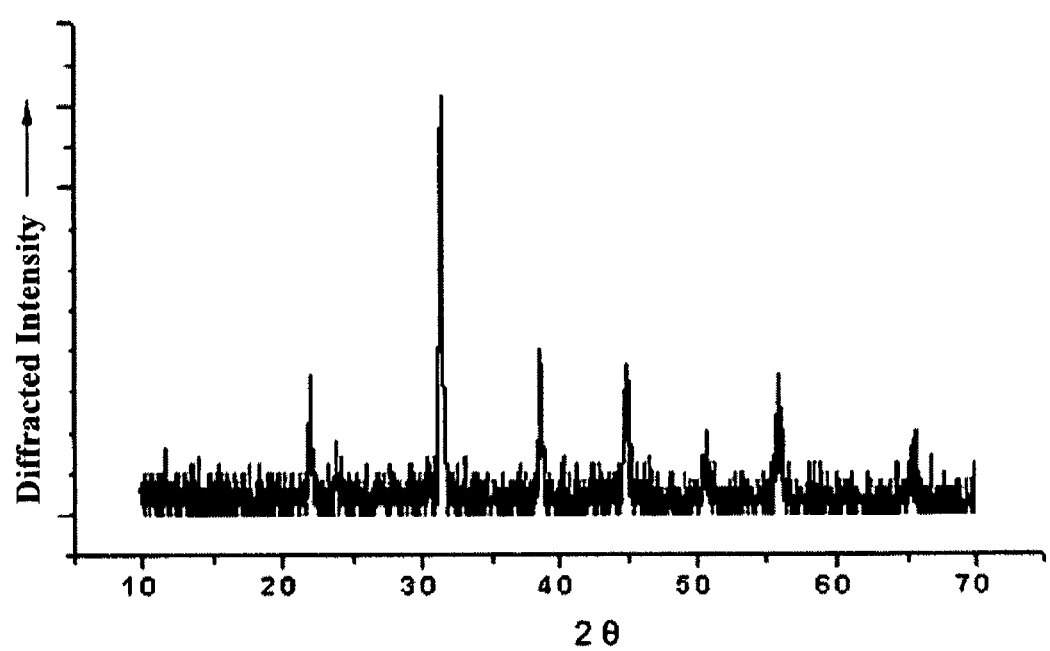
FIG. 2 shows an X-ray Diffraction (XRD) image of the mono-dispersed barium titanate powders in accordance with the first embodiment.

About 20 ml (milliliter) of ethanol is added to a container and agitation begins. While agitating, 1 ml of tetrachloride titanium ($TiCl_4$) ethanol solution with a concentration of 1 mol/L (molar/milliliter) is added to the container and after mixing uniformly, 25 ml of barium nitrate ($BaNO_3$) with a concentration of 0.2 mol/L is added in to form a solution. Owing to the hydrolyzation of the $TiCl_4$, the solution becomes white turbid. Sodium hydroxide (NaOH) solution with a concentration of 2 mol/L is added in to regulate the PH value to greater than 14. Then the solution is agitated to mix uniformly, and transferred to a reactor of 40 ml with a lining of polytetrafluoroethylene (PTFE). A small amount of ethanol is added to fill 80% of the volume of the reactor. After that the reactor is sealed and placed to an oven with a set synthesis temperature of 80° C.-240° C. to react for more than 6 hours. After the reaction, the reactor is naturally cooled, the lining is taken out, the top liquid in the reactor is removed (the ethanol in the liquid can be reused) and a white deposit at the bottom of the reactor is collected. Then, the white deposit is washed by an ethanol solution containing a hydrochloric acid with a mass concentration of 2% and water alternately until a PH value of the resultant washing liquid thereof is less than 7. Finally, the solution with the white deposit therein is subjected to centrifugal separation to acquire a white solid, the white solid is collected and dried in a vacuum drying oven with a temperature of 60° C. to obtain mono-dispersed metal titanate. A Transmission Electron Microscope (TEM) image of the mono-dispersed barium titanate is shown in FIG. 1 and an X-ray Diffraction (XRD) image thereof is shown in FIG. 2.

EXAMPLE (2)

Figure 3:
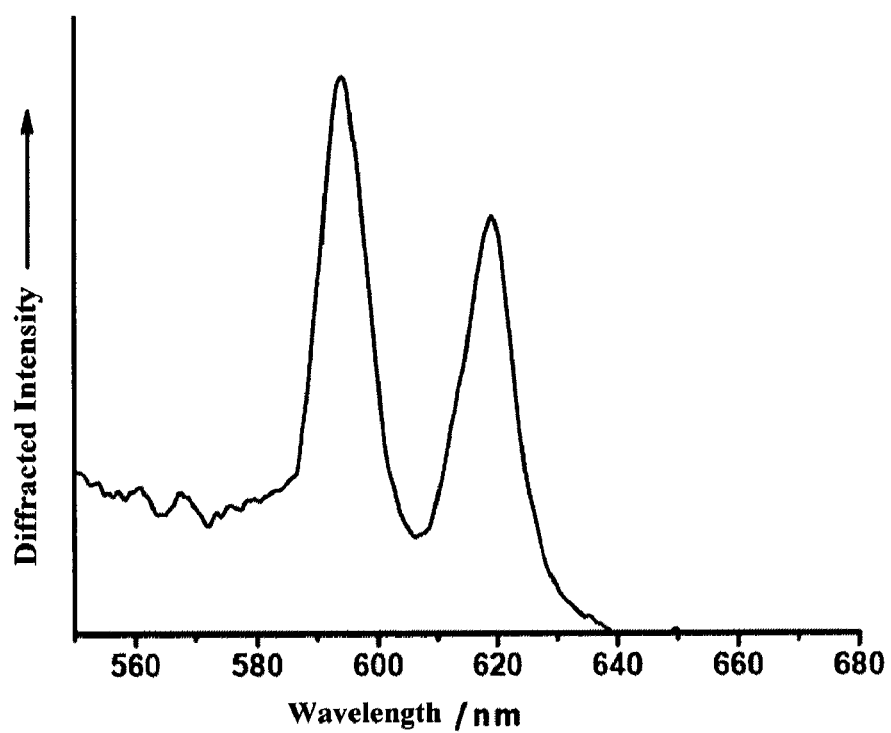
FIG. 3 shows a fluorescent spectrum image of the mono-dispersed barium titanate powders with $Eu^{3+}$ doping in accordance with a second embodiment.

About 20 ml (milliliter) of ethanol is added to a container and agitation begins. While agitating, 1 ml of $Ti(OC_4H_9)_4$ ethanol solution with a concentration of 1 mol/L is added to the container and after mixing uniformly, a mixture of 24.5 ml of barium nitrate ($BaNO_3$) with a concentration of 0.2 mol/L and 0.5 ml of europium nitrate ($Eu(NO_3)_3$) with a concentration of 0.2 mol/L is added to form a solution. Owing to the hydrolyzation of the $Ti(OC_4H_9)_4$, the solution becomes white turbid. Sodium hydroxide (NaOH) with a concentration of 2 mol/L is added to regulate the PH value greater than 14. Then the solution is agitated to mix uniformly, and transferred to a reactor of 40 ml with a lining of polytetrafluoroethylene (PTFE). A small amount of ethanol is added to fill 80% of the volume of the reactor. After that, the reactor is sealed and placed to an oven with a set synthesis temperature of 110° C.-120° C. to react for 12 hours. After the reaction, the reactor is naturally cooled, the lining is taken out, the top liquid in the reactor is removed (the ethanol in the liquid can be reused) and white deposit at the bottom of the reactor is collected. Then, the white deposit is washed by an ethanol solution containing a hydrochloric acid with a mass concentration of 2% and water alternately until a PH value of the resultant washing liquid thereof is less than 7. Finally, the solution with the white deposit therein is subjected to centrifugal separation to acquire a white solid, the white solid is collected and dried in a vacuum drying oven with a temperature of 60° C. to obtain $Eu^{3+}$ doped mono-dispersed metal titanate ($BaTiO_3$:$Eu^{3+}$ (10%)). The $Eu^{3+}$ doped mono-dispersed metal titanate ($BaTiO_3$:$Eu^{3+}$ (10%)) fluoresces red when irradiated with ultraviolet radiation. A fluorescent spectrum image of the $Eu^{3+}$ doped mono-dispersed barium titanate powder is shown in FIG. 3.

EXAMPLE (3)

About 25 ml (milliliter) of ethanol is added to a container, and agitation begins. While agitating, 2 ml of tetrachloride titanium ($TiCl_4$) ethanol solution with a concentration of 0.5 mol/L is added to the container and after mixing uniformly, a mixture of 24.5 ml of barium nitrate ($BaNO_3$) with a concentration of 0.2 mol/L and 0.5 ml of europium nitrate (Eu$(NO_3)_3$) with a concentration of 0.2 mol/L is added to form a solution. The container with the solution therein is then heated to a temperature of 80° C. in a water bath and refluxing begins. Sodium hydroxide (NaOH) with a concentration of 2 mol/L is added to regulate the PH value greater than 14. A small amount of ethanol is added to the container to compensate for the ethanol lost in heating. Stopping the heating and naturally cooling the solution after the refluxing reaction is conducted for about 24 hours and subsequently subjecting the solution to centrifugal separation to acquire white deposit. Then the white deposit is washed by an ethanol solution containing a hydrochloric acid with a mass concentration of 2% and water alternately until a PH value of the resultant washing liquid thereof is less than 7. Finally, the solution with the white deposit therein is subjected to centrifugal separation to acquire a white solid, the white solid is collected and dried in a vacuum drying oven with a temperature of 60° C. to acquire $Eu^{3+}$ doped mono-dispersed barium titanate. The $Eu^{3+}$ doped mono-dispersed barium titanate ($BaTiO_3$:$Eu^{3+}$ (10%)) fluoresces red when irradiated with ultraviolet radiation.

EXAMPLE (4)

About 20 ml (milliliter) of ethanol is added to a container, and agitation begins. While agitating, 1 ml of $Ti(OC_4H_9)_4$ ethanol solution with a concentration of 1 mol/L is added to the container and after mixing uniformly, a mixture of 24.5 ml of barium nitrate (BaNO$_3$) with a concentration of 0.2 mol/L and 0.5 ml of eterbium nitrate (Tb(NO$_3$)$_3$) with a concentration of 0.2 mol/L is added to form a solution. Owing to the hydrolyzation of the Ti(OC$_4$H$_9$)$_4$, the solution becomes white turbid. Sodium hydroxide (NaOH) with a concentration of 2 mol/L is added to regulate the PH value greater than 14. Then the solution is agitated to mix uniformly and transferred to a reactor of 40 ml with a lining of polytetrafluoroethylene (PTFE). A small amount of ethanol is added to fill 80% of the volume of the reactor. After that the reactor is sealed and placed in an oven with a set synthesis temperature of 110° C.-120° C. to react for 12 hours. After the reaction, the reactor is naturally cooled to room temperature, the lining is taken out, the top liquid in the reactor is removed (the ethanol in the liquid can be reused) and white deposit at the bottom of the reactor is collected. Then the white deposit is washed by an ethanol solution containing a hydrochloric acid with a mass concentration of 2% and water alternately until a PH value of the resultant washing liquid thereof is less than 7. Finally, the solution with the white deposit therein is subjected to centrifugal separation to acquire a white solid, the white solid is collected and dried in a vacuum drying oven with a temperature of 60° C. to acquire eterbium ion doped mono-dispersed barium titanate. The eterbium ion doped mono-dispersed barium titanate (BaTiO$_3$:Tb$^{3+}$ (10%)) fluoresces green when irradiated with ultraviolet radiation.

EXAMPLE (5)

About 25 ml (milliliter) of ethanol is added to a container, and agitation begins. While agitating, 2 ml of tetrachloride titanium (TiCl$_4$) ethanol solution with a concentration of 0.5 mol/L is added to the container and after mixing uniformly, a mixture of 24.5 ml of barium nitrate (BaNO$_3$) with a concentration of 0.2 mol/L and 0.5 ml of eterbium nitrate (Tb(NO$_3$)$_3$) with a concentration of 0.2 mol/L is added to form a solution. The container with solution therein is heated to a temperature of 80° C. in a water bath and a refluxing begins. Sodium hydroxide (NaOH) with a concentration of 2 mol/L is added to regulate the PH value greater than 14. A small amount of ethanol is added to the container to compensate for the ethanol lost in heating. Stopping the heating and naturally cooling the solution after the reflux reaction conducted for 24 hours and subsequently subjecting the solution to centrifugal separation to acquire a white deposit. Then, the white deposit is washed by an ethanol solution containing a hydrochloric acid with a mass concentration of 2% and water alternately until a PH value of the resultant washing liquid thereof is less than 7. Finally, the solution with the white deposit therein is subjected to centrifugal separation to acquire a white solid, the white solid is collected and dried in a vacuum drying oven with a temperature of 60° C. to acquire Tb$^{3+}$ doped mono-dispersed barium titanate. The Tb$^{3+}$ doped mono-dispersed barium titanate (BaTiO$_3$:Tb$^{3+}$ (10%)) fluoresces green when irradiated with ultraviolet radiation.

EXAMPLE (6)

Figure 4:
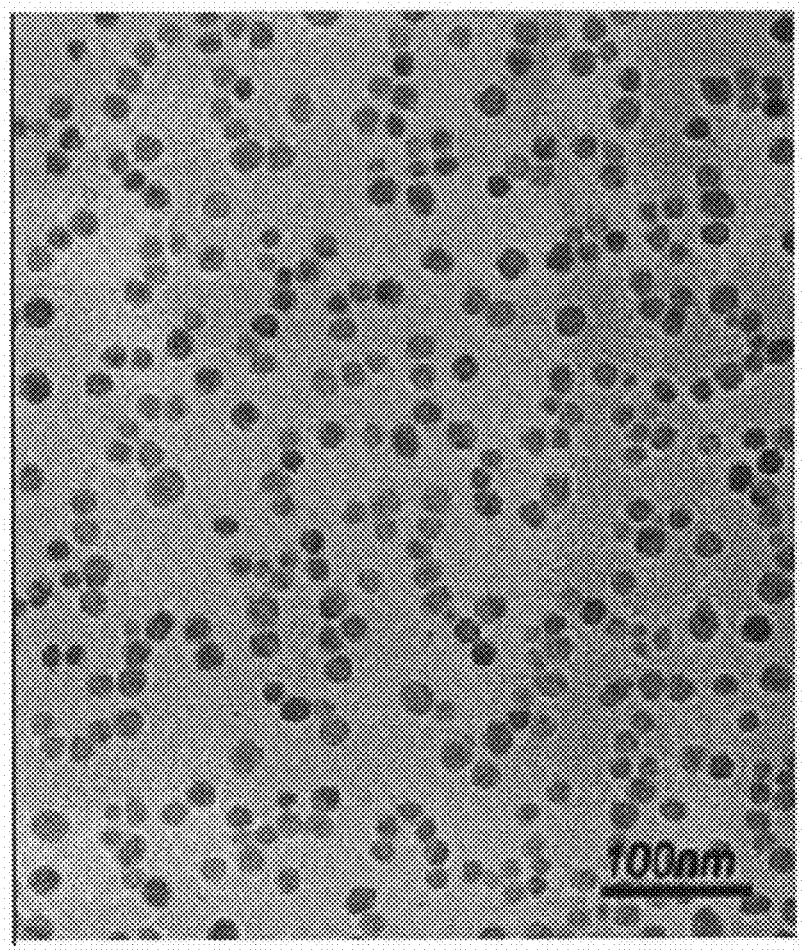
FIG. 4 shows a Transmission Electron Microscope (TEM) image of the mono-dispersed plumbum titanate powders in accordance with a sixth embodiment.
Figure 5:
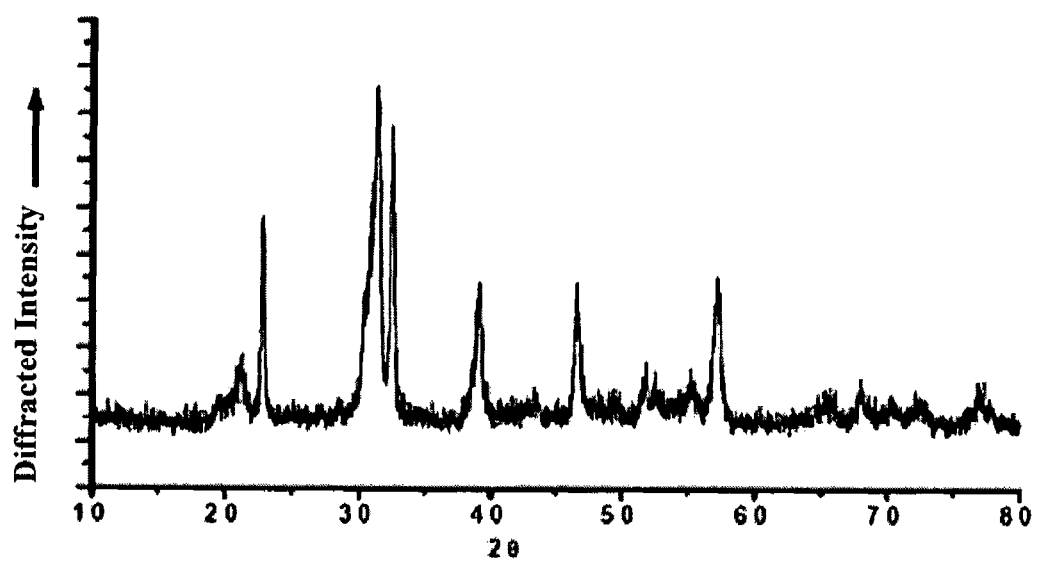
FIG. 5 shows an X-ray Diffraction (XRD) image of the mono-dispersed plumbum titanate powders in accordance with the sixth embodiment.

About 20 ml (milliliter) of ethanol is added to a container, and agitation begins. While agitating, 1 ml of Ti(OCH(CH$_3$)$_2$)$_4$ ethanol solution with a concentration of 1 mol/L is added to the container and after mixing uniformly, 25 ml of plumbum chloridize (PbCl) is added to form a solution. Sodium hydroxide (NaOH) with a concentration of 2 mol/L is added in to regulate the PH value greater than 14. Then the solution is agitated to mix uniformly, and transferred to a reactor of 40 ml with a lining of polytetrafluoroethylene (PTFE). A small amount of ethanol is added to fill 80% volume of the reactor. After that the reactor is sealed and placed in an oven with a set synthesis temperature of 110° C.-120° C. to react for 8-12 hours. After the reaction, the reactor is naturally cooled, the lining is taken out, the top liquid in the reactor is removed (the ethanol in the liquid can be reused) and white deposits at the bottom of the reactor are collected. Then, the white deposit is washed by an ethanol solution containing a hydrochloric acid with a mass concentration of 2% and water alternately until a PH value of the resultant washing liquid thereof is less than 7. Finally, the solution with the white deposit therein is subjected to centrifugal separation to acquire a white solid, the white solid is collected and dried in a vacuum drying oven with a temperature of 60° C. to acquire mono-dispersed plumbum titanate. A Transmission Electron Microscope (TEM) image of the mono-dispersed plumbum titanate is shown in FIG. 4 and an X-ray Diffraction (XRD) image thereof is shown in FIG. 5.

EXAMPLE (7)

About 25 ml (milliliter) of ethanol is added to a container, and agitation begins. While agitating, 1 ml of Ti(OC$_4$H$_9$)$_4$ ethanol solution with a concentration of 1 mol/L is added to the container, and after mixing uniformly, 5 ml of plumbum nitrate (PbNO$_3$) with a concentration of 0.2 mol/L is added in to form a solution. The container with the solution therein is heated to a temperature of 80° C. in a water bath and refluxing begins. Sodium hydroxide (NaOH) with a concentration of 2 mol/L is added to regulate the PH value greater than 14. A small amount of ethanol is added to the container to compensate for the ethanol lost in heating. Stopping the heating and naturally cooling the solution after the reflux reaction is conducted for 20-24 hours and subsequently subjecting the solution to centrifugal separation to acquire white deposits. Then, the white deposit is washed by an ethanol solution containing a hydrochloric acid with a mass concentration of 2% and water alternately until a PH value of the resultant washing liquid thereof is less than 7. Finally, the solution with the white deposit therein is subjected to centrifugal separation to acquire a white solid, the white solid is collected and dried in a vacuum drying oven with a temperature of 60° C. to acquire mono-dispersed plumbum titanate.

EXAMPLE (8)

Figure 6:
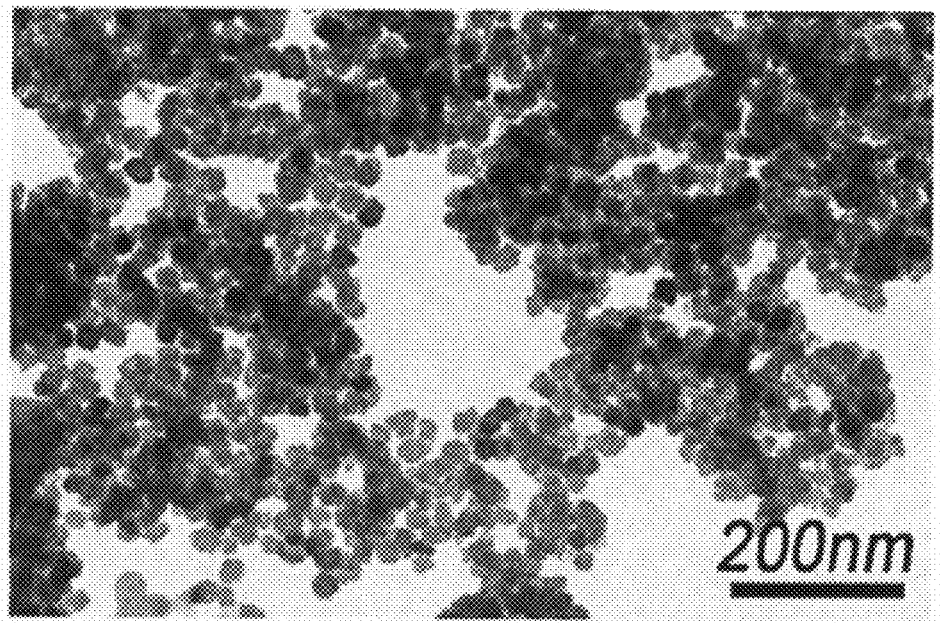
FIG. 6 shows a Transmission Electron Microscope (TEM) image of the mono-dispersed strontium titanate powders in accordance with an eighth embodiment.
Figure 7:
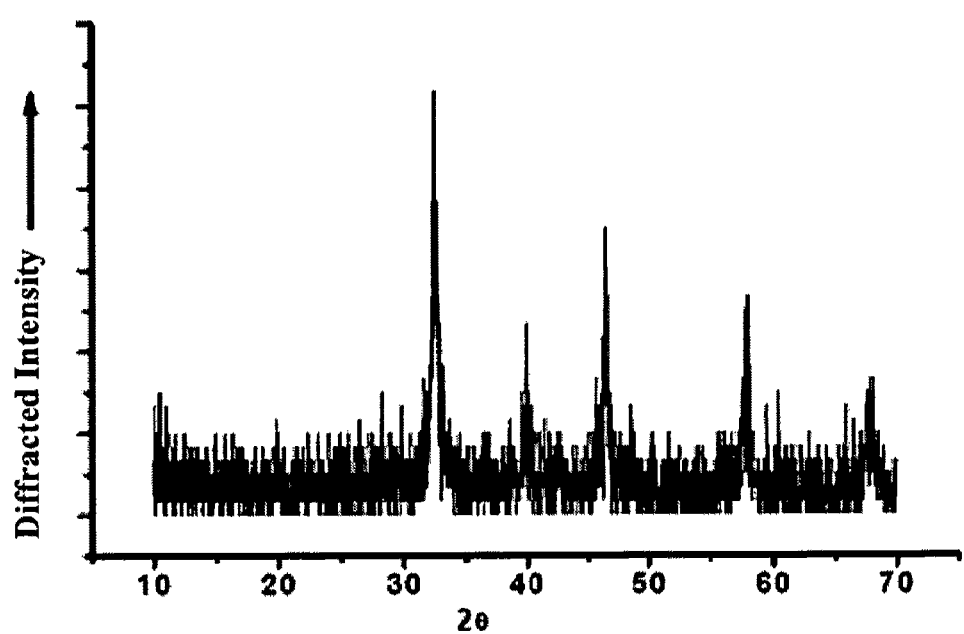
FIG. 7 shows an X-ray Diffraction (XRD) image of the mono-dispersed strontium titanate powders in accordance with the eighth embodiment.

About 25 ml (milliliter) of ethanol is added in a container, and agitation begins. While agitating, 2 ml of tetrachloride titanium (TiCl$_4$) ethanol solution with a concentration of 0.5 mol/L is added to the container, and after mixing uniformly, 5 ml of strontium nitrate (Sr(NO$_3$)$_2$) with a concentration of 0.2 mol/L is added to form a solution. The container with the solution therein is heated to a temperature of 80° C. in a water bath and refluxing begins. Sodium hydroxide (NaOH) with a concentration of 2 mol/L is added to regulate a PH value greater than 14. A small amount of ethanol is added to the container to compensate for the ethanol lost in heating. Stopping the heating and naturally cooling the solution after reflux reaction is conducted for 20-24 hours and subsequently subjecting the solution to centrifugal separation to acquire a white deposits. Then, the white deposit is washed by an ethanol solution containing a hydrochloric acid with a mass concentration of 2% and water alternately until a PH value of the resultant washing liquid thereof is less than 7. Finally, the solution with the white deposit therein is subjected to centrifugal separation to acquire a white solid, the white solid is collected and dried in a vacuum drying oven with a temperature of 60° C. to acquire mono-dispersed strontium titanate. A Transmission Electron Microscope (TEM) image of the mono-dispersed strontium titanate is shown in FIG. 6 and an X-ray Diffraction (XRD) image thereof is shown in FIG. 7.

EXAMPLE (9)

Figure 8:
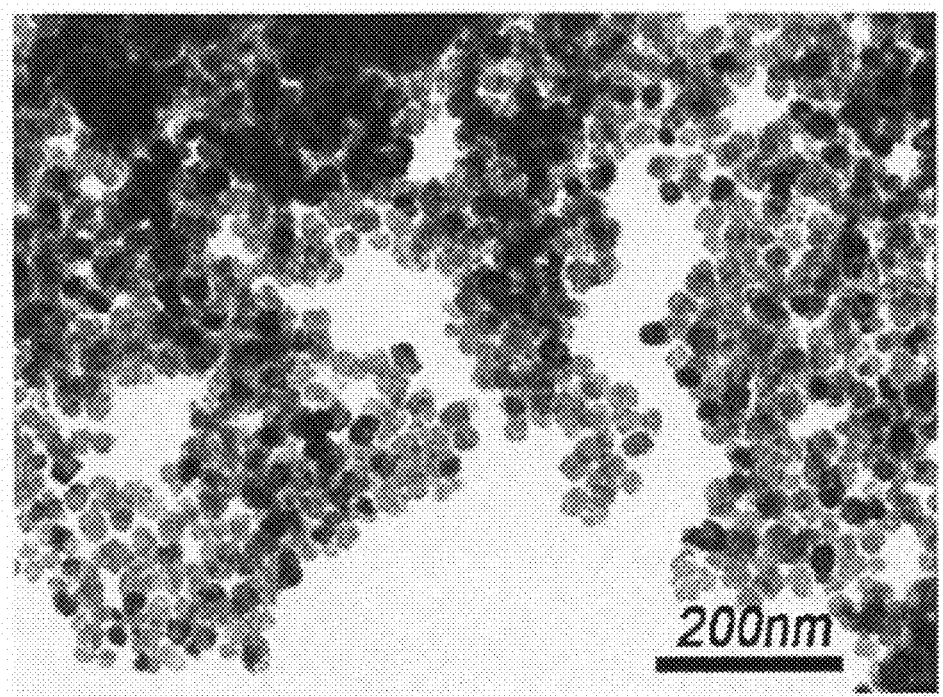
FIG. 8 shows a Transmission Electron Microscope (TEM) image of the mono-dispersed barium strontium titanate powders in accordance with a ninth embodiment.
Figure 9:
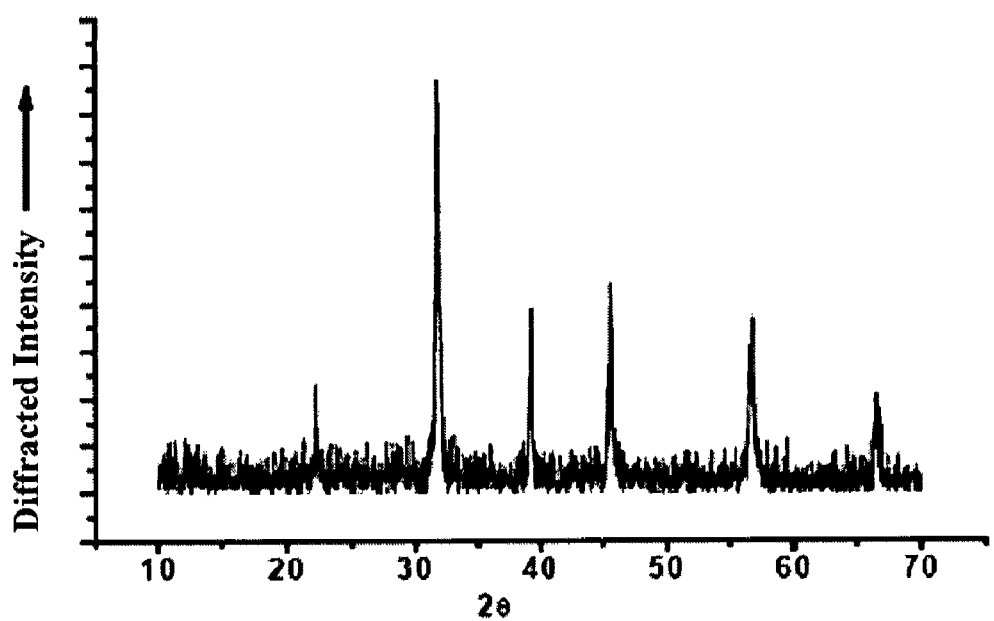
FIG. 9 shows an X-ray Diffraction (XRD) image of the mono-dispersed barium strontium titanate powders in accordance with the ninth embodiment.

About 20 ml (milliliter) of ethanol is added to a container, and agitation begins. While agitating, 1 ml of $Ti(OC_4H_9)_4$ ethanol solution with a concentration of 1 mol/L is added to the container and after mixing uniformly, a mixture of 25 ml of barium nitrate ($BaNO_3$) with a concentration of 0.2 mol/L and 25 ml of strontium nitrate ($Sr(NO_3)_2$) with a concentration of 0.2 mol/L is added to form a solution. Owing to the hydrolyzation of the $Ti(OC_4H_9)_4$, the solution becomes white turbid. Sodium hydroxide (NaOH) with a concentration of 2 mol/L is added to regulate the PH value to greater than 14. Then the solution is agitated to mix uniformly, and transferred to a reactor of 40 ml with a lining of polytetrafluoroethylene (PTFE). The color of the whole system becomes light yellow. A small amount of ethanol is added to fill 80% of the entire volume of the reactor. After that the reactor is sealed and placed in an oven with a set synthesis temperature of 110° C.-120° C. to react for 12-16 hours. After the reaction, the reactor is naturally cooled, the lining is taken out, the top liquid in the reactor is removed (the ethanol in the liquid can be reused) and white deposits at the bottom of the reactor are collected. Then, the white deposit is washed by an ethanol solution containing a hydrochloric acid with a mass concentration of 2% and water alternately until a PH value of the resultant washing liquid thereof is less than 7. Finally, the solution with the white deposit therein is subjected to centrifugal separation to acquire a white solid, the white solid is collected and dried in a vacuum drying oven with a temperature of 60° C. to acquire mono-dispersed barium strontium titanate ($Ba_{0.5}Sr_{0.5}TiO_3$). A Transmission Electron Microscope (TEM) image of the mono-dispersed barium strontium titanate is shown in FIG. 8 and an X-ray Diffraction (XRD) image thereof is shown in FIG. 9.

EXAMPLE (10)

About 500 ml (milliliter) of ethanol is added to a container, and agitation begins. While agitating, 20 ml of tetrachloride titanium ($TiCl_4$) ethanol solution with a concentration of 0.5 mol/L is added to the container, and after mixing uniformly, a mixture of 50 ml of barium nitrate ($BaNO_3$) with a concentration of 0.2 mol/L and 50 ml of strontium nitrate ($Sr(NO_3)_2$) with a concentration of 0.2 mol/L is added in to form a solution. The container with the solution therein is heated to a temperature of 80° C. in a water bath and refluxing begins. Sodium hydroxide (NaOH) with a concentration of 5 mol/L is added to regulate a PH value greater than 14. A small amount of ethanol is added to the container to compensate for the ethanol lost in heating. Stopping the heating and naturally cooling the solution after the reflux reaction is conducted for 20-24 hours and subsequently subjecting the solution to centrifugal separation to acquire white deposits. Then, the white deposit is washed by an ethanol solution containing a hydrochloric acid with a mass concentration of 2% and water alternately until a PH value of the resultant washing liquid thereof is less than 7. Finally, the solution with the white deposit therein is subjected to centrifugal separation to acquire a white solid, the white solid is collected and dried in a vacuum drying oven with a temperature of 60° C. to acquire mono-dispersed barium strontium titanate ($Ba_{0.5}Sr_{0.5}TiO_3$).

The metal titanate synthesized by the present embodiments has a high purity, uniform particles, small size and good dispersion and therefore it is an excellent electronic ceramic material. A metal titanate doped with rare earth ions also can be synthesized via the present methods and the metal titanate doped with rare earth ions is a fluorescent material and has widespread application possibilities, such as fluorescent ink, fluorescent paints, fluorescent security, and as well as fluorescent biomarkers.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. A method for making fluorescing mono-dispersed metal titanate, the method comprising the steps of:
   (a) mixing titanate ester, metal salt, and rare earth metal salt in a molar ratio of 1:1:x in a reaction medium comprised of ethanol and water to form a solution, wherein x is in the range from above 0 to 0.1;
   (b) heating the solution, under an alkaline condition to form a white sediment;
   (c) filtering out liquid part of the solution to obtain the white sediment,
   (d) washing the white sediment, and
   (e) drying the white sediment to obtain rare earth metal doped mono-dispersed metal titanate,
   wherein the rare earth metal in the rare earth metal salt comprises at least one material selected from the group consisting of europium, terbium, erbium, ytterbium and thulium, and the rare earth metal salt fluoresces the mono-dispersed metal titanate.

2. The method as claimed in claim 1, wherein the rare earth metal salt comprises at least one material selected from the group consisting of rare earth metal hydroxide, rare earth metal halide, and rare earth metal oxysalt.

3. The method as claimed in claim 1, wherein the titanate ester is selected from the group consisting of methyl ester titanate, tetraethyl ester titanate, isopropyl ester titanate, and tetrabutyl ester titanate.

4. The method as claimed in claim 1, wherein the metal salt comprises at least one material selected from the group consisting of metal hydroxide, metal halide, and metal oxysalt.

5. The method as claimed in claim 4, wherein the metal of the metal salt comprises at least one material selected from the group consisting of barium, strontium, plumbum, magnesium, and calcium.

6. The method as claimed in claim 1, wherein in step (e), the drying process is conducted in a vacuum drying oven at a temperature of 60° C.

7. The method as claimed in claim 1, wherein a size of the mono-dispersed metal titanate ranges from about 10 nanometers to about 100 nanometers.

8. The method as claimed in claim 1, wherein in step (b), the solution has a PH value greater than 14.

9. The method as claimed in claim 1, wherein in step (b), a container with the solution therein is heated in a water bath.

10. The method as claimed in claim 1, wherein in step (e), the white solid is collected and dried in a vacuum drying oven with a temperature of about 60° C.

11. The method as claimed in claim 1, wherein in step (b), the white sediment is formed using a refluxing process, the refluxing process being performed at a temperature in an approximate range from 60° C. to 90° C. for a time period in an approximate range from 20 hours to 24 hours.

12. A method for making fluorescing mono-dispersed metal titanate, the method comprising the steps of:
(a) mixing titanium tetrachloride, metal salt, and rare earth metal salt in a molar ratio of 1:1:x in a reaction medium comprised of ethanol and water to form a solution, wherein x is in the range from above 0 to 0.1;
(b) heating the solution, under an alkaline condition to form a white sediment;
(c) filtering out liquid part of the solution to obtain the white sediment,
(d) washing the white sediment, and
(e) drying the white sediment to obtain rare earth metal doped mono-dispersed metal titanate, wherein the rare earth metal in the rare earth metal salt comprises at least one material selected from the group consisting of europium, terbium, erbium, ytterbium and thulium, and the rare earth metal salt fluoresces the mono-dispersed metal titanate.

13. A method for making fluorescing mono-dispersed metal titanate, the method comprising the steps of:
(a) mixing titanate ester, metal salt, and rare earth metal salt in a molar ratio of 1:1:x in a reaction medium comprised of ethanol and water to form a solution, wherein x is in the range from above 0 to 0.1;
(b) heating the solution, under an alkaline condition to form a white sediment;
(c) filtering out liquid part of the solution to obtain the white sediment,
(d) washing the white sediment, and
(e) drying the white sediment to obtain rare earth metal doped mono-dispersed metal titanate,
wherein in step (d), the white sediment is washed using an ethanol solution and water alternately until a PH value of resultant washing liquid thereof is less than 7, wherein the rare earth metal in the rare earth metal salt comprises at least one material selected from the group consisting of europium, terbium, erbium, ytterbium and thulium, and the rare earth metal salt fluoresces the mono-dispersed metal titanate.

14. The method as claimed in claim 13, wherein in step (d), the ethanol solution contains a hydrochloric acid with a mass concentration of about 2%.

15. The method as claimed in claim 13, wherein in step (b), the white sediment is formed using a hydrothermal process, the hydrothermal process being performed at a temperature in range from about 90° C. to about 240° C. for a time period ranging from about 6 hours to about 24 hours.

* * * * *